Sept. 14, 1965 F. J. RYCHLIK 3,205,877
RADIAL ENGINE
Filed Jan. 30, 1963 10 Sheets-Sheet 1
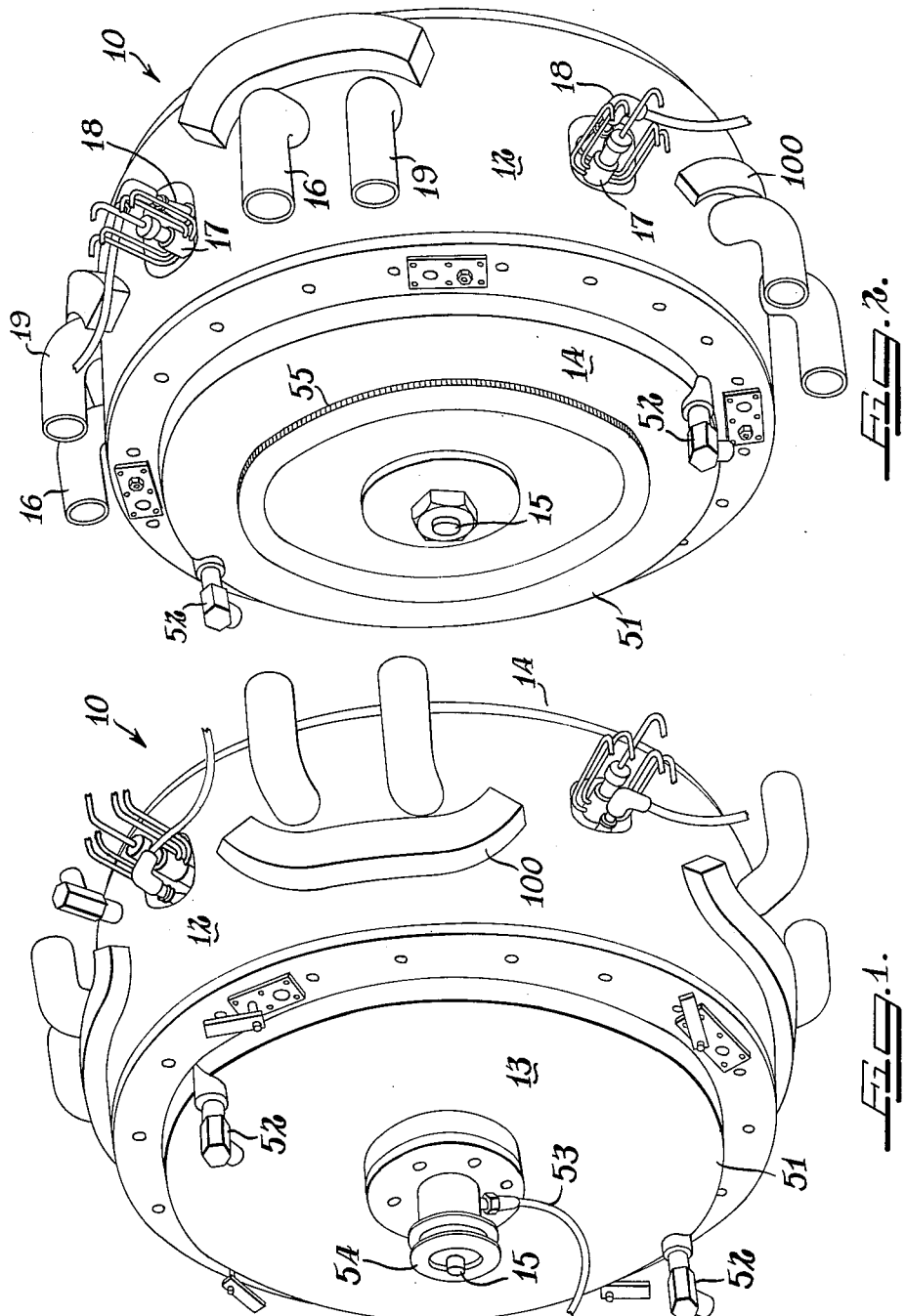
INVENTOR.
FRANK J. RYCHLIK
BY
Cromwell, Greist & Warden
Attys.

INVENTOR.
FRANK J. RYCHLIK

Sept. 14, 1965  F. J. RYCHLIK  3,205,877
RADIAL ENGINE
Filed Jan. 30, 1963  10 Sheets-Sheet 3
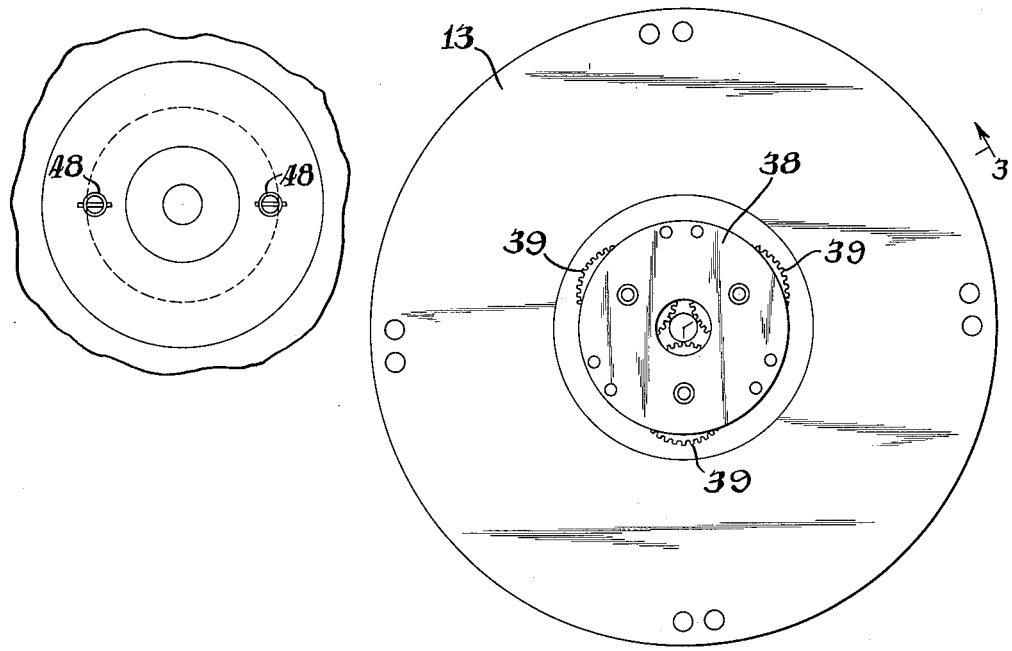
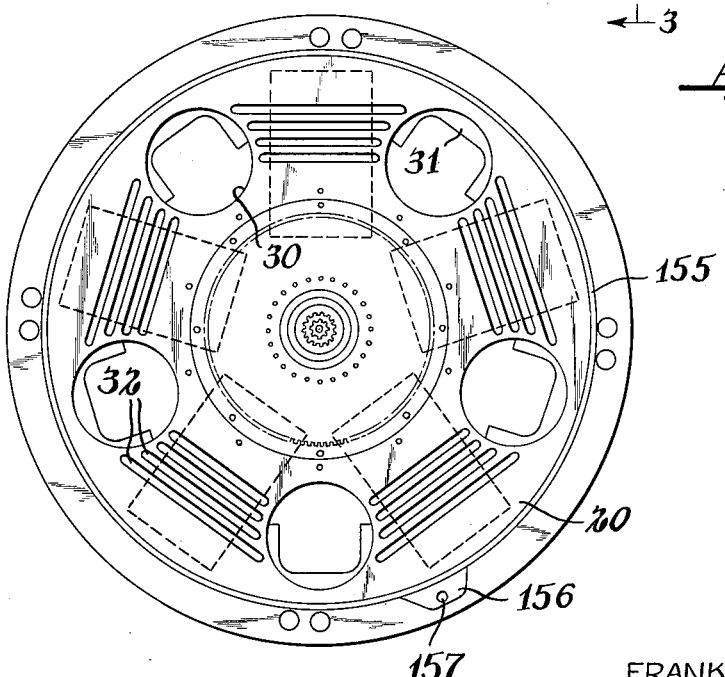
INVENTOR.
FRANK J. RYCHLIK
BY
Cromwell, Greist & Warden
Attys.

INVENTOR.
FRANK J. RYCHLIK

Sept. 14, 1965     F. J. RYCHLIK     3,205,877
RADIAL ENGINE
Filed Jan. 30, 1963     10 Sheets-Sheet 5
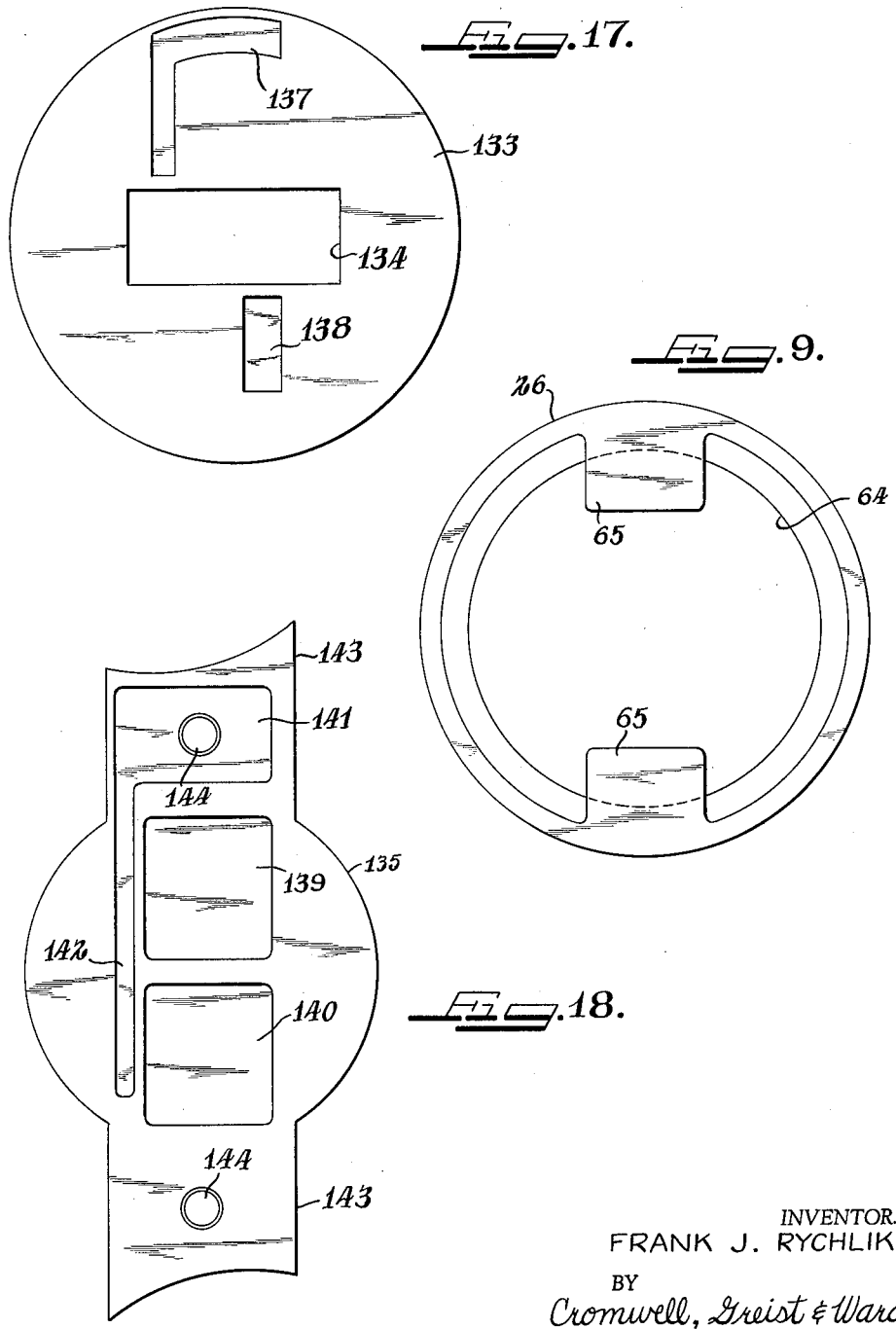
INVENTOR.
FRANK J. RYCHLIK
BY
Cromwell, Greist & Warden
Attys.

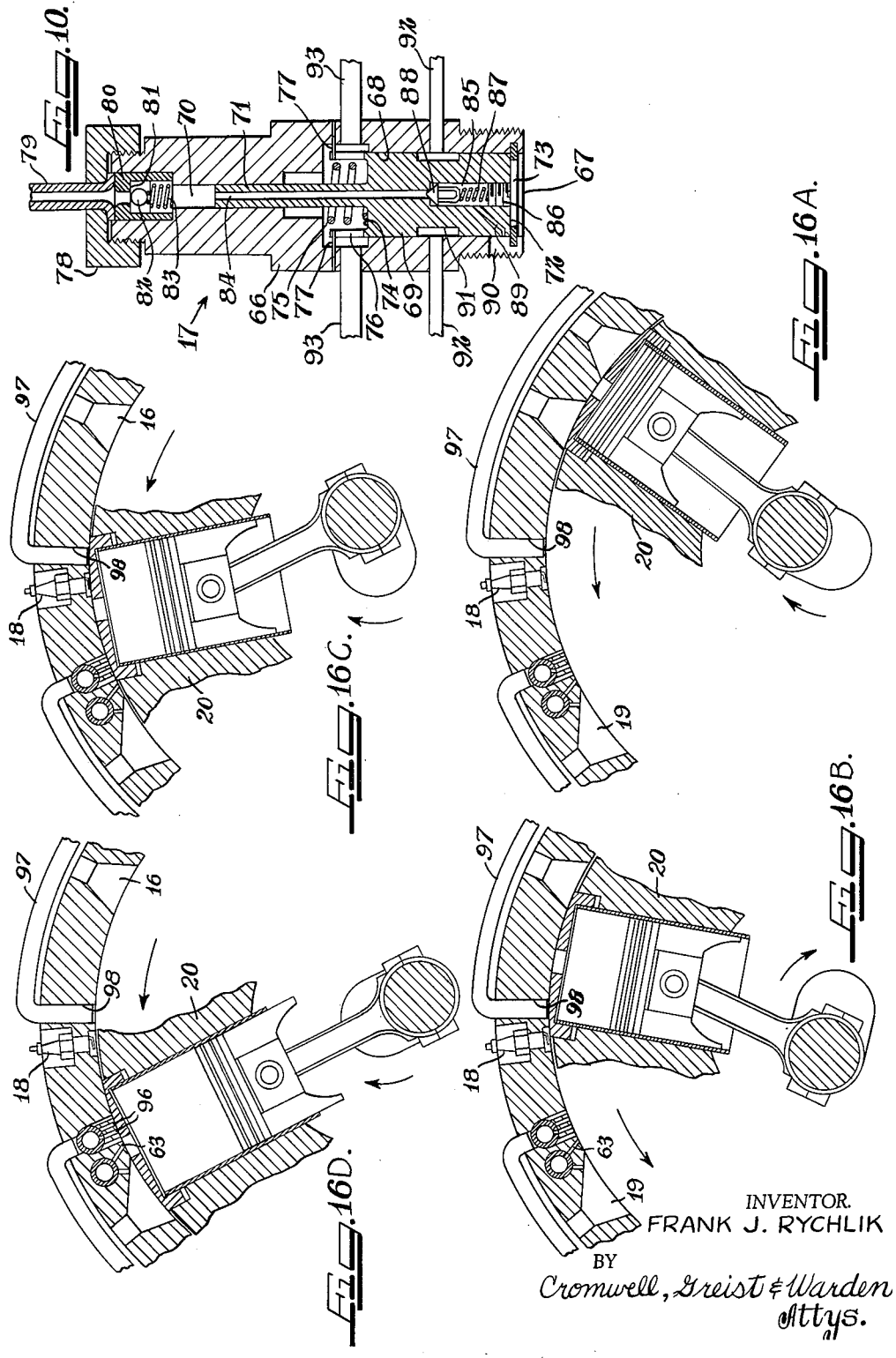

Sept. 14, 1965 F. J. RYCHLIK 3,205,877
RADIAL ENGINE
Filed Jan. 30, 1963 10 Sheets-Sheet 7
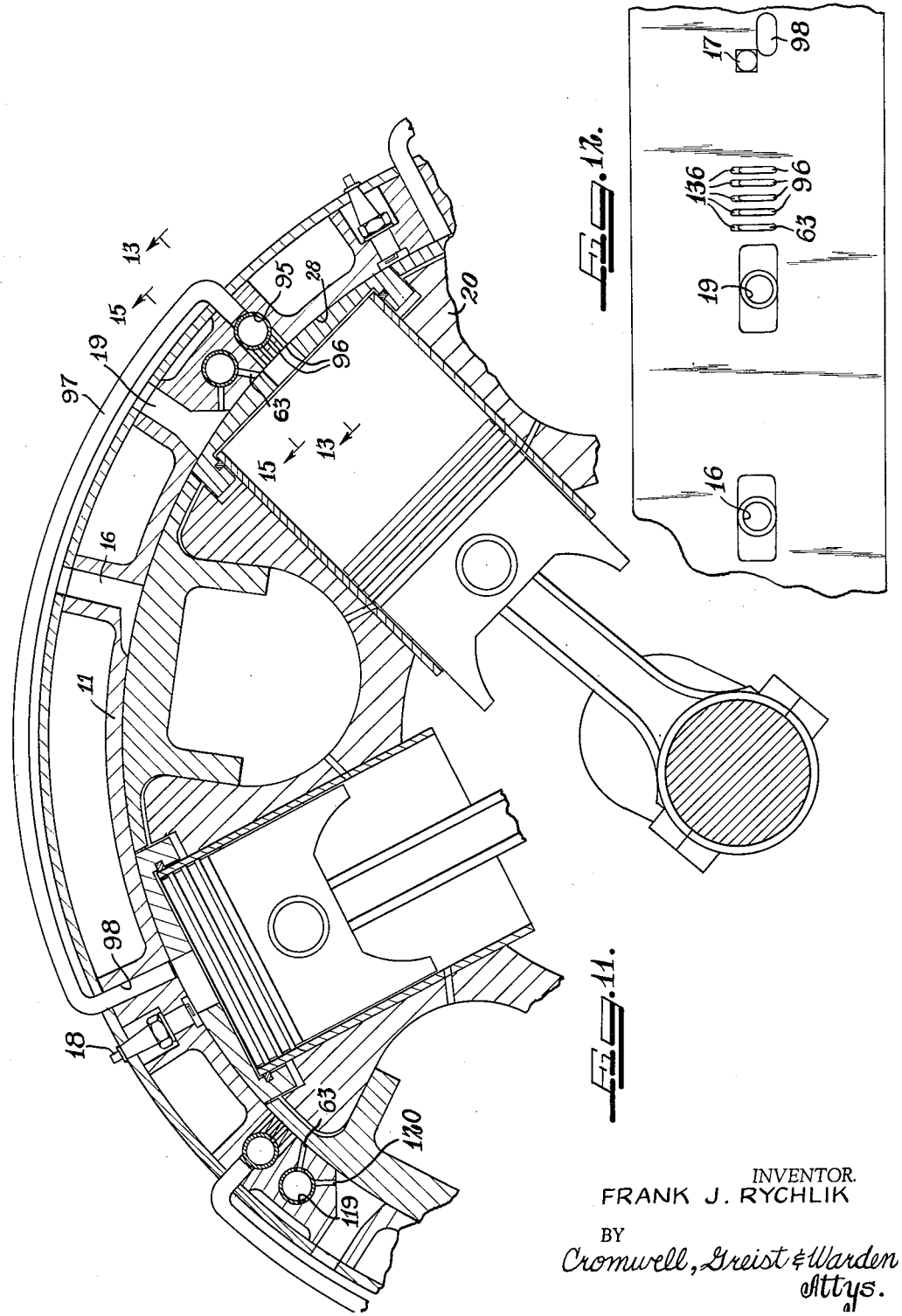
INVENTOR.
FRANK J. RYCHLIK
BY
Cromwell, Greist & Warden
Attys.

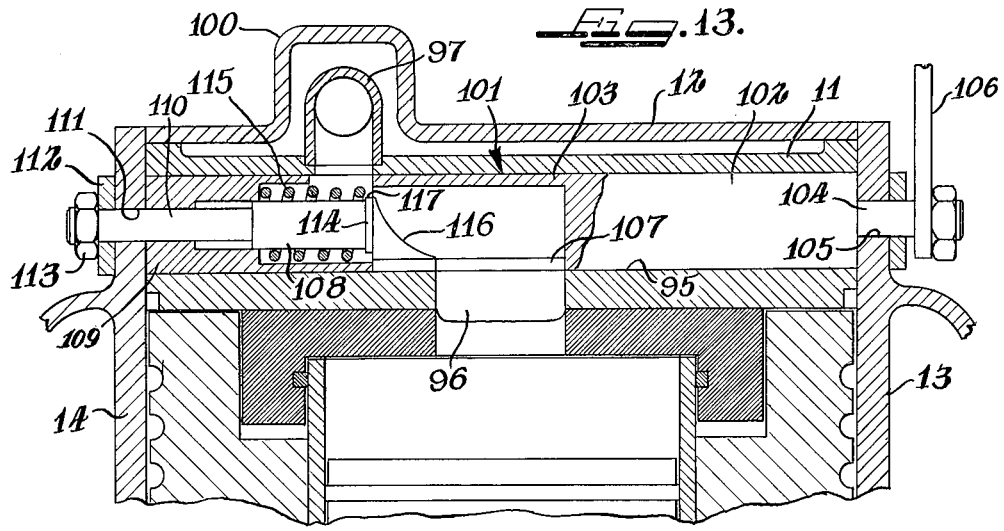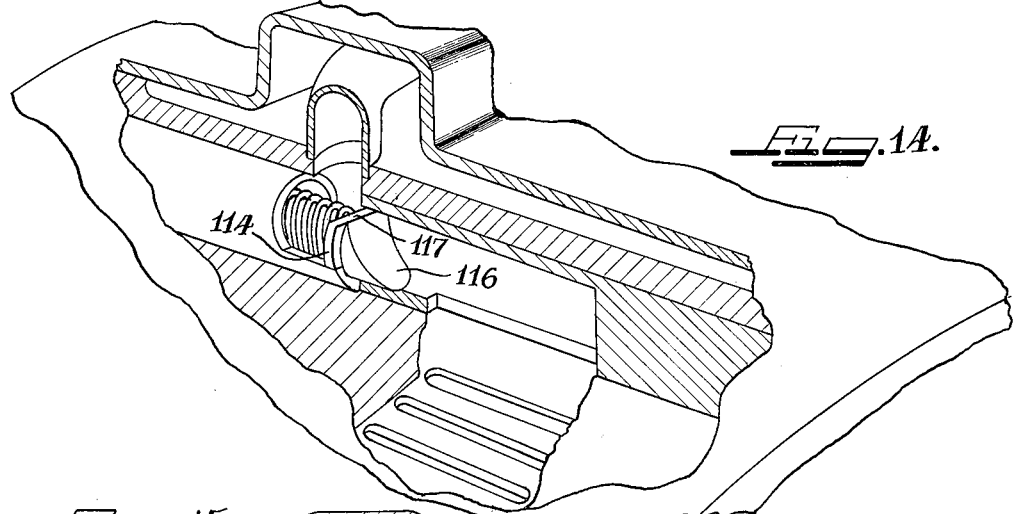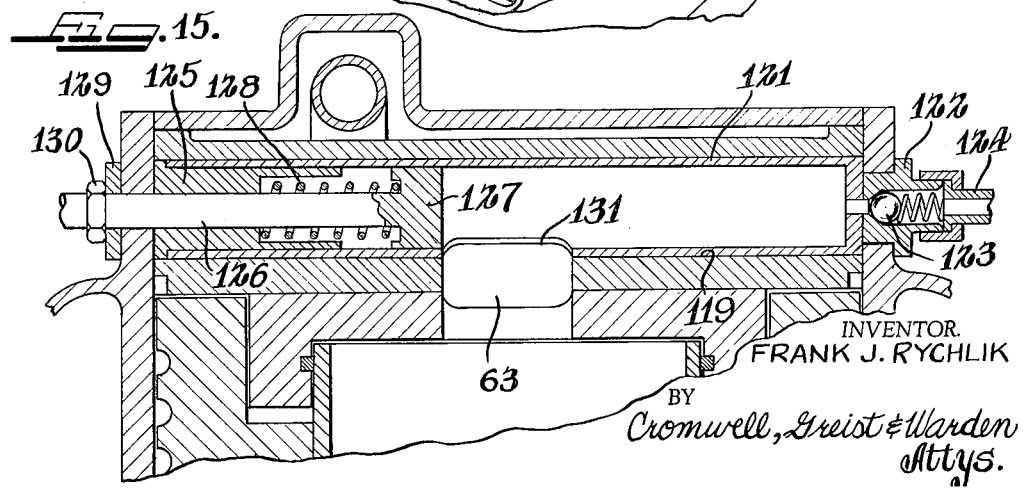

Sept. 14, 1965     F. J. RYCHLIK     3,205,877
RADIAL ENGINE
Filed Jan. 30, 1963     10 Sheets-Sheet 9
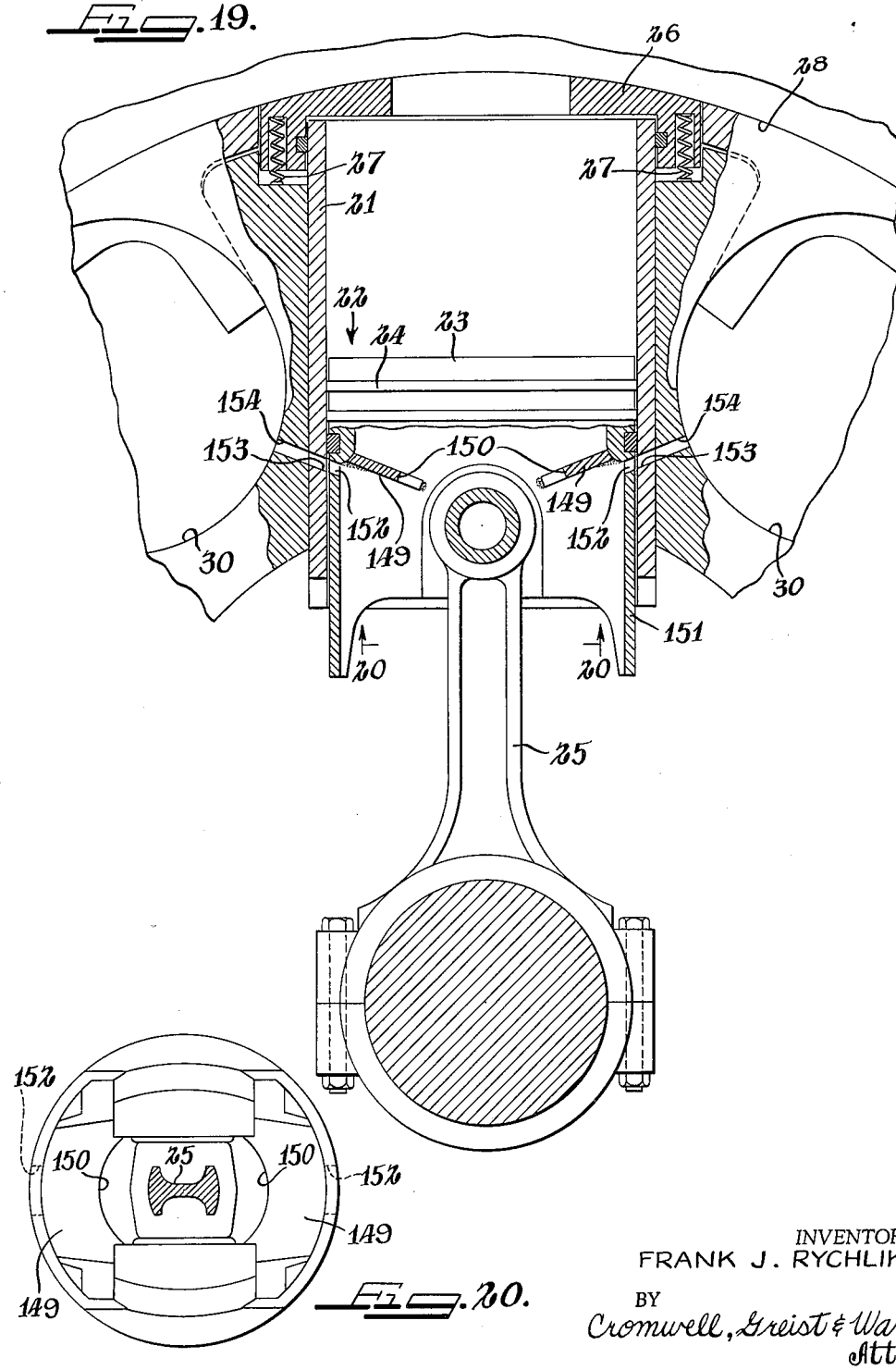
INVENTOR.
FRANK J. RYCHLIK
BY Cromwell, Greist & Warden
Attys.

Sept. 14, 1965  F. J. RYCHLIK  3,205,877
RADIAL ENGINE
Filed Jan. 30, 1963  10 Sheets-Sheet 10
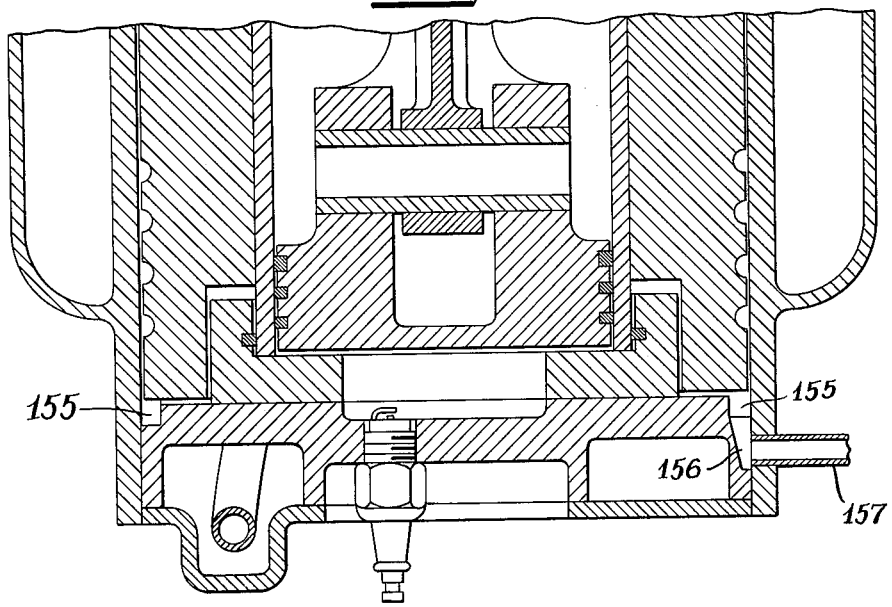
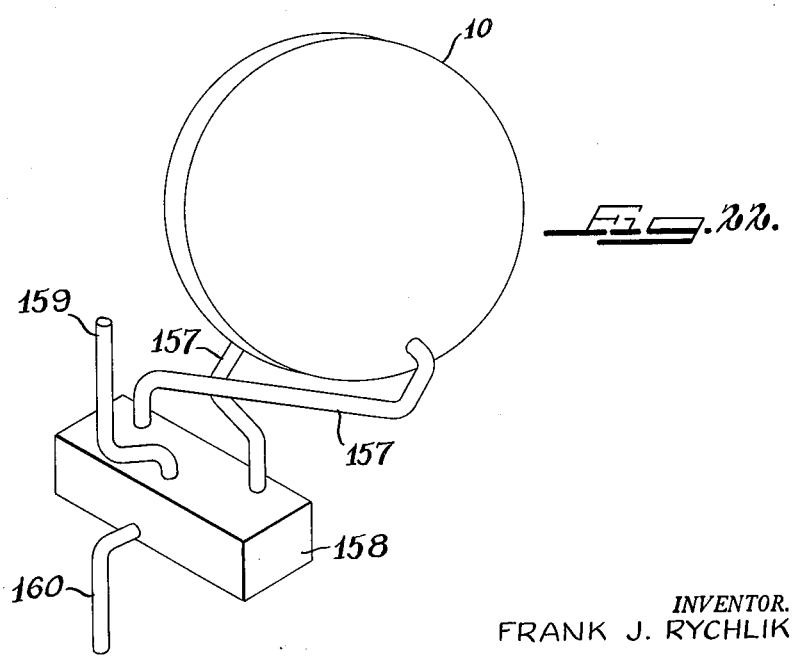
INVENTOR.
FRANK J. RYCHLIK
BY
Cromwell, Greist & Warden
Attys.

United States Patent Office 3,205,877
Patented Sept. 14, 1965

3,205,877
RADIAL ENGINE
Frank J. Rychlik, 1415 Glenview Road, Glenview, Ill.
Filed Jan. 30, 1963, Ser. No. 254,385
10 Claims. (Cl. 123—44)

This invention relates to a new and improved form of internal combustion power source, generally referred to as a radial engine. More specifically, the invention is directed to a new and improved design of radial engine as well as new and improved components therefor and method of operating same.

The engine of the invention is a radial-type internal combustion power source of uncomplicated structure and design and capable of highly efficient operation including, among other things, full utilization of available power developed thereby. Among the advantages gained from the engine design herein disclosed is the complete inherent balancing of the various cooperating parts for at least virtually vibration free operation without the necessity of relying on basically non-functional counterbalancing elements. In this respect the engine is fully adapted for many different uses involving automotive and marine applications.

Additional features of this invention involve a new and improved fuel injector specially adapted for use with the subject engine but also readily adapted for use with other known types of internal combustion power sources. The fuel injector in the environment used permits operation of the engine under stratified firing conditions wherein a chemically correct main fuel mixture is relied upon as the primary source of power with this mixture undergoing adequate and complete combustion to eliminate the type of exhaust which contributes materially to air pollution. Still further, the engine is adapted to accommodate a special method of firing which also constitutes a part of the invention.

The basic engine design permits a wide variety of uses with or without certain standard automotive and marine accessories such as distributors. The engine can be readily adapted for operation with different fuels, such as gasoline and diesel. An additional important aspect of the invention deals with the tapping of cylinder gas in a unique manner for extraneous operation of accessories, for example, power steering, power brakes, air conditioning, heaters, etc.

The foregoing constitute objects of the present invention in conjunction with the basic object of providing a new and improved radial-type internal combustion engine of uncomplicated and efficient design.

An additional basic object is to provide new and improved uses of pressurized cylinder gases and means for controlling the use of such gases for selective purposes, such as accessory operation and engine timing.

Still another object is to provide a new and improved compact engine design including efficient utilization of a special cooling system independently and additionally in conjunction with a unique lubricating system.

Another object is to provide a unique automatic firing system for a radial engine which is capable of operation independent of timed ignition means.

A further object is to provide a new and improved lubricant control arrangement for piston heads and related elements in radial-type engines whereby controlled lubricant replacement and circulation is obtained.

Still a further specific object is to provide a new and improved form of fuel injector adapted for use in any type of internal combustion engine wherein the injection of a controlled quantity of fuel is desired, the injector having special utility with the preferred form of radial engine of the present invention.

Another object is to provide a new and improved method of operation of internal combustion engines basically involving the use and ignition of a chemically balanced oxygen-fuel mixture in a new and improved manner.

Other objects not specifically set forth will become apparent from the following detailed description of the invention made in conjunction with the accompanying drawings wherein:

FIGS. 1 and 2 are opposite end perspectives of the radial engine of the invention;

FIG. 4 is an inner face view of the left end plate of FIG. 3 illustrating a special gear arrangement;

FIG. 5 is an end view of the rotary piston housing of the engine as viewed generally along line 5—5 of FIG. 3;

FIG. 6 is a fragmentary elevational view of the center portion of the right end plate of the engine of FIG. 3 as viewed generally along line 6—6 therein;

FIG. 9 is a plan view of one form of cylinder cap used with the type of engine operation represented in FIG. 8;

FIG. 10 is a vertical section of the new and improved fuel injector of the invention of a type especially adapted for use with the sequence of engine operation set forth in FIG. 8;

FIG. 11 is a fragmentary transverse section of a portion of a modified engine illustrating a special timing and firing arrangement;

FIG. 12 is a diagrammatic representation of a series of fuel intake, firing and exhaust means controlling piston cycle operation in the modified engine of FIG. 11, this view being illustrative of the arrangement of each series of these means along the inner annular surface of the chamber receiving the rotary piston housing;

FIG. 13 is a fragmentary longitudinal section of the timing and firing arrangement of the engine of FIG. 11 taken generally along line 13—13 therein;

FIG. 14 is a fragmentary perspective of the arrangement of FIG. 13;

FIG. 15 is a fragmentary longitudinal section of the exhaust gas tapping arrangement forming a part of the present invention, this view being taken generally along line 15—15 in FIG. 11;

FIGS. 16A through 16D are diagrammatic sectional views of the cycle of operation of a single piston of the engine of FIG. 11;

FIG. 17 is a plan view of a preferred form of cylinder cap used with the engine of FIG. 11;

FIG. 18 is a plan view of a preferred form of piston housing sealing shoe used with the form of engine illustrated in FIG. 11;

FIG. 19 is an enlarged fragmentary section of a single piston and cylinder involving the lubricant flow control arrangement constituting a part of the invention;

FIG. 20 is a transverse bottom plan view of the piston head as viewed generally along line 20—20 in FIG. 19;

FIG. 21 is a fragmentary section of an outer peripheral portion of the engine illustrating another part of the special lubricating system of the invention; and FIG. 22 is a diagrammatic illustration of the external parts of the special lubricating system.

Figure 3:
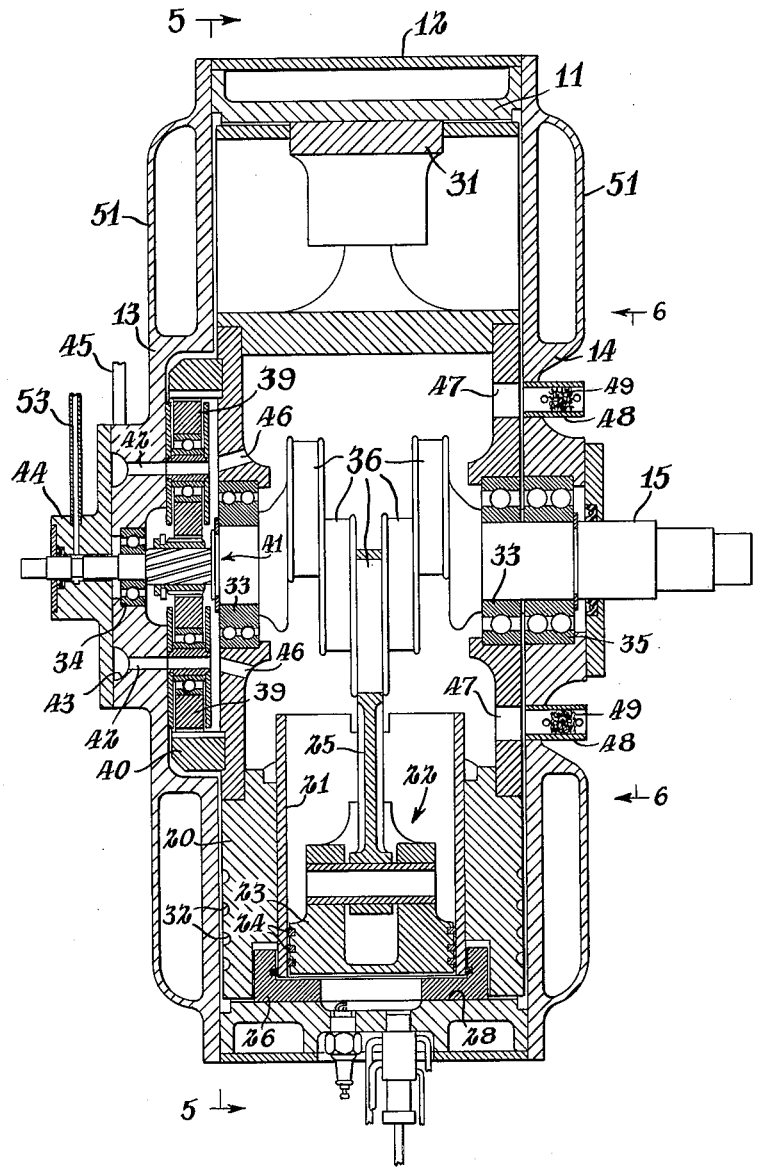
FIG. 3 is a generally vertical cross section of the engine with the section being viewed along a line such as line 3—3 of FIG. 4.

Referring to FIGS. 1-3, the form of radial engine 10 illustrated basically comprises a stationary housing of annular configuration including an inner ring member 11 receiving thereabout an annular cover member 12 and enclosed along opposite ends by end or side plates 13 and 14. A central power or drive shaft 15 in the form of a crankshaft extends axially through the stationary housing with ends projecting out of the center portions of the end plates 13 and 14. As shown in FIGS. 1 and 2, the stationary housing about the outer periphery thereof includes a plurality of series of main fuel mixture intakes 16, raw fuel injectors 17, ignition means in the form of spark plugs 18, and cylinder exhausts 19.

Referring particularly to FIGS. 3 and 5, the stationary housing receives therein a rotary piston housing 20 which is of annular configuration provided with a central opening through which the shaft 15 extends. The housing includes therein a plurality of circumferentially spaced and radially directed cylinder sleeves 21 in which are received reciprocating pistons 22 each including in general a piston head 23 peripherally mounting a purality of piston rings 24 and a pivotally attached connecting rod 25. Each cylinder sleeve 21 receives about the outer end thereof a cylinder cap 26 which, as best shown in FIG. 19, is resiliently pressed by a plurality of springs 27 against the inner annular wall surface 28 of the ring member 11 of the stationary housing.

Referring again particularly to FIGS. 3 and 5, the piston housing 20 between the cylinder sleeves 21 thereof is provided with axial bores or core openings 30 which function to reduce the overall weight of the piston housing, aid in the cooling thereof and function as a part of the special lubricating system. The core openings 30 reecive therein along the outer periphery of the piston housing intermediate the cylinder caps 26 a plurality of sealing caps or shoes 31 with the outer surfaces thereof being in sliding sealing engagement with the inner annular wall surface 28 of the ring member 11. The primary purpose for the shoes 31 is to seal off the intake and exhaust when a cylinder is not aligned therewith. Opposite side surfaces of the piston housing 20 are preferably formed with a series of grooves 32 overlying the piston areas to aid in the cooling thereof as well as the cooling of the lubricant as will be described.

FIG. 3 illustrates the piston housing 20 as rotatably mounted on the shaft 15 through suitable bearings 33 for rotation relative thereto. The shaft 15 is also journaled in the end plate 13 by bearings 34 and is journaled in the end plate 14 by bearings 35. Centrally of the piston housing 20 the shaft 15 is formed with a plurality of crank or throw sections 36 which are individually radially offset from the longitudinal axis of the shaft and which are circumferentially arranged relative to one another so that the shaft is rotatably balanced. A connecting rod 25 is suitably annularly engaged with a crank section 36 (see FIG. 19) for controlled rotation of the shaft 15, the connection between each rod and crank section being a sliding connection of known type. In this manner reciprocation of the pistons 23 during their multiple cycles of operation impart rotation to the shaft 15 for driving thereof for power output.

The piston housing 20 is driven by the shaft 15 through a planetary gear unit 38 suitably mounted along the central inner portion of the end plate 13 as shown in FIGS. 3 and 4. The unit 38 includes three gears 39 symmetrically arranged and all of which outwardly engage a ring gear 40 which is fixed to the piston housing 20. The planetary gear unit 38 is driven through a timing gear unit 41 mounted on the shaft 15. The bearing centers of the gears 39 are hollow and are aligned with ports 42 extending axially through the center portion of the end plate 13 and in comunication at their outer ends with an annular recess 43 formed in the outer surface of the central hub portion of the end plate. A cover plate 44 closes off the recess 43 and a tube 45 is suitably connected to the recess 43. This tube is designed for connection to the intake manifold of a standard fuel supply system carburetor and a vacuum is established therein which is effective through the ports 42.

The piston housing 20 includes a plurality of passages 46 arranged to become rotatably aligned with the ports 42 during engine operation thus providing means to permit the vacuum therein to be effective within the center opening of the piston housing around the cranksections 36. The opposite end of the piston housing also includes a series of passages 47 which become rotatably aligned with a plurality of breather tubes 48 fixedly mounted in the end plate 14 and including suitable filter elements 49 therein. The location of the breather tubes 48 is shown in FIG. 6, these tubes being avilable to the atmosphere to permit the drawing of fresh air through the center of the engine in response to the vacuum created in the manifold tube 45. In this manner operational heat including gas aid oil fumes is continuously removed from the center portion of the engine to aid in efficient operation thereof. Any back pressure which might interfere with proper engine operation in this portion of the engine is completely avoided.

The end plates are formed with external annular water jackets 51 for engine cooling purposes. FIGS. 1 and 2 illustrate the provision of hose connections 52 communicating with each of the jackets 51 for the circulation of water or other suitable coolant therethrough. The jackets 51 are arranged to radially overlie the piston operating areas of the piston housing to provide for temperature reduction in the area of highest temperature operation.

The cover plate 44 further includes an oil feed connection 53 which is in communication with the shaft 15 and forms a part of the lubricant circulating system to be described. Referring to FIG. 1, the end of the shaft 15 projecting from the end plate 13 may mount thereon a suitable pulley 54 for the driving of engine accessories, such as a generator or the like. FIG. 2 illustrates the opposite end of the shaft 15 projecting beyond the end plate 14 and mounting thereon a main drive gear 55. This particular gear and its connection is merely illustrative of means for shaft power output utilization, it being understood that any suitable power take-off arrangement may be utilized with the engine bearing in mind that the same is readily adapted for variable uses including marine as well as automotive.

The basic radial engine described is a five cylinder engine with the cylinders being slightly symmetrically offset to provide inherent balance thus eliminating the necessity of separate shaft counterbalancing. In this respect the cylinders are spaced within about 2° of equal 72° symmetrical spacing. The slight spacing variation overcomes the developmenut of harmonics during engine operation. This particular engine operates on the four cycle principle involving four separate series of ports and elements for intake, combustion and exhaust. This arrangement permits complete power impulse balancing which adds to the overall non-vibrating aspects of the engine. By way of example only, the crankshaft is geared to tthe piston housing on a basis of a 7 to 1 ratio with the piston housing rotating in the direction opposite to the rotation of the shaft. The principles of design may of course be used with engines having two or more cylinders.

Figure 7:
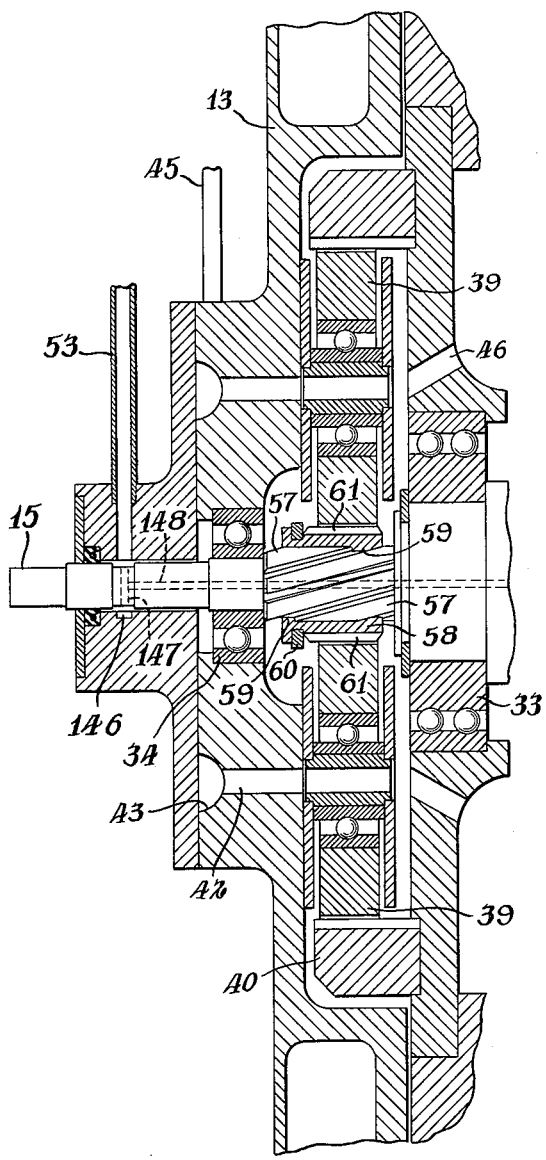
FIG. 7 is an enlarged fragmentary section of the piston housing drive arrangement including a special gear timing means.

FIG. 7 best illustrates the timing gear unit 41 provided to vary the position of the piston housing 20 relative to the shaft 15 to control the operational timing of the engine. The unit 41 includes a plurality of circumferentially arranged and longitudinally angled splines 57 carried by the portion of the shaft received through the planetary gear unit 38. A sleeve gear 58 is received about the splined portion of the shaft and includes along the inner surface thereof complementary splines 59 which slidably intermesh with the splines 57. With this arrangement the sleeve gear 58 is longitudinally slidable along the splined portion of the shaft 15 and during its advance or retraction therealong the gear is at least slightly rotated relative to the shaft in a counterclockwise or clockwise direction. The movement of the sleeve gear 58 along the splined portion of the shaft may be controlled by any suitable means such as a control fork or yoke 60 of which only the end portion is shown. This yoke is fixed to the outer end portion of the sleeve gear and movement thereof rotates the gear as controlled by the spline connection relative to the shaft 15. Of course, other combinations of gear toothing capable of performing the intended function can be used.

The outer surface of the sleeve gear 58 is formed with a plurality of longitudinal gear teeth 61 which are intermeshed with the teeth of the planetary gears 39 and which directly drive the same. Operative displacement or movement of the sleeve gear 58 relative to the shaft 15 results in a momentary increase or reduction in the speed of rotation of the planetary gears 39 which in turn is imparted to the ring gear 40 and the piston housing 20. In this manner the position of the cylinders in their cycles of operation may be changed during operation of the engine to increase or decrease the speed of operation of the engine. The change of position of the sleeve gear 58 relative to the shaft 15 is readily accommodated by the intermeshing teeth of the sleeve gear and planetary gears by reason of the teeth 61 being of sufficient length to retain a drive connection with the teeth of the planetary gears during slight relative longitudinal movement therebetween. Movement of the sleeve gear 58 may be controlled by any suitable hydraulic system or a mechanical or electrical governor system (not shown) connected to the accelerator for engine speed control. This simple arrangement eliminates the necessity of using a conventional distributor and is substantially maintenance free.

Figure 8:
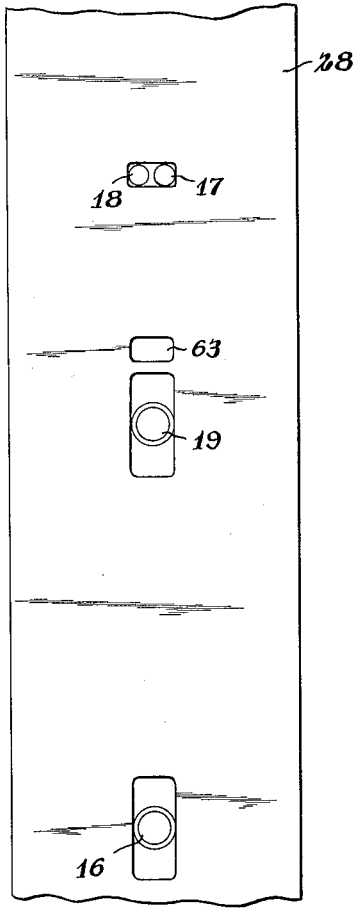
FIG. 8 is a diagrammatic representation of one form of a series of fuel intake, firing and exhaust means controlling piston cycle operation in the engine, this view being representative of a portion of the inner annular surface of the chamber in which the rotatable piston housing is received.

FIG. 8 illustrates in diagrammatic plan view the series of control means for the operation of a cylinder through a single cycle. As described in connection with FIGS. 1 and 2, the direction of operation of a cylinder along the inner annular surface 28 of the ring member 11 involves alignment with an opening through which the injector 17 and plug 18 are exposed for the firing of the cylinder, a combustion gas exhaust opening 19 and a fuel intake opening 16 beyond which the main fuel supply undergoes compression before the cylinder becomes aligned with the injector and plug opening of the next series of control means. As shown in FIG. 8, an auxiliary exhaust opening 63 is provided immediately prior to the exhaust opening 19 in the direction of operation, this auxiliary exhaust opening providing for the tapping of combustion gas from the cylinder for accessory operation as will be described.

Each cylinder cap 26 adapted for use with the arrangement of FIG. 8 involving the injector 17 is preferably of special configuration as shown in FIG. 9. Each cap 26 includes a relatively wide opening 64 with a pair of inwardly extending and oppositely positioned sealing flanges 65 which are aligned in the direction of rotation of the piston housing. The sealing flanges 65 are effective, for example, to control the time of communication of each cylinder with the auxiliary exhaust 63 to permit efficient utilization of this portion of the engine and eliminating concurrent cylinder exposure to the main exhaust 19.

FIGURE 10 illustrates the injector 17 as comprising an annular housing 66 having an open end 67 in communication with an internal piston chamber 68 in which a piston 69 is mounted for reciprocation in snug engagement with the inner surface of the chamber 68. The housing 66 is further formed with an axially elongated fuel pressurization chamber 70 into which is slidably received a plunger portion 71 formed integrally as a part of the piston 69. The piston is formed with a generally flat end surface 72 which is exposed through the open end 67 of the housing and which peripherally engages suitable stop means such as a ring 73 fixed in the housing at the open end thereof. The inner end portion of the piston 69 is formed with a radial shoulder portion 74 surrounding the base of the plunger portion 71 which defines a seat for one end of a coil spring 75 received in the piston chamber 68. The outer peripheral portion of the radial shoulder 74 is formed with an axially extending annular web 76 which is suitably slotted or apertured to slidably receive therein transverse locking pins 77 fixed in the housing 66 to hold the piston 69 against rotation and yet permit reciprocation thereof within the chamber 68.

The upper end of the housing 66 threadedly receives thereon a cap member 78 which clamps thereto a fuel line 79 extending to a source of fuel such as a pump or the like (not shown). The line 79 in the form illustrated is clamped against an annular insert 80 received in the upper end of the pressurization chamber 70 and formed with an annular valve seat 81 against which a ball check valve 82 is urged by a coil spring 83 suitably seated in the chamber 70.

The piston 69 including the plunger portion 71 is formed with a continuous longitudinal port or passage 84 which extends from communication with the pressurization chamber 70 into communication with an enlarged valve chamber 85 closed off at the bottom surface 72 of the piston by a filler set screw 86. The set screw 86 provides a back-up for a coil spring 87 which preloads a valve element 88 against the outer end surface of the passage 84. To one side of the valve chamber 85 is a spray nozzle port 89 which is in communication with a side marginal portion of the piston spaced from the end 72 thereof. The bottom portion of the housing 66 is provided with a slot 90 which exposes the nozzle port 89 in a direction to one side of the injector.

The purpose of the fuel injector 17 is to provide for a timed injection of a predetermined quantity of raw fuel into association with the spark producing end of the adjacent plug 18 for ignition of the raw fuel. Fuel is delivered through the line 79 past the one-way check valve 82 into the pressurization chamber 70 until the valve 82 is effective to prevent further introduction. This may occur either prior to or simultaneously with movement of the piston 69 upwardly against the spring 75 in response to the pressure of a compressed air-fuel mixture in a cylinder which has become aligned with the open end of the housing 66. Upward movement of the piston 69 results in the advancing of the plunger portion 71 further into the pressurization chamber 70 and the pressurizing of the raw fuel therein and in the passage 84 to an extent that the pressure ultimately overcomes the spring 87 and opens the valve 88 to permit delivery of the fuel into the chamber 85 and ultimately out through the spray nozzle port 89 into direct contact with the sparking end of the adjacent plug 18. The set screw 86 may be adjusted to vary the force of the spring 87 and the pressure necessary to open the valve 88. Following injection of raw fuel to an extent that the pressure in the chamber 70 is sufficiently reduced, the valve 88 will automatically close. As the cylinder moves past the injector out of communication with the piston 69, the spring 75 functions to return the piston downwardly into engagement with the stop ring 73.

Preferably, the piston 69 will be provided with an annular groove 91 for the introduction of lubricant for efficient operation of the injector. Lubricant is delivered and removed through tubes 92 which are suitably connected to the main lubricating system. Also preferably, lines 93 will form a part of the carburetor intake manifold vacuum system communicating through the housing 66 with the spring area of the chamber 68 to prevent the building up of any back pressure therein caused by fumes or the like to maintain efficient operation of the balanced injector.

The fuel injector 17 permits the efficient use of a rarified or chemically balanced main fuel mixture introduced into each cylinder through the respective fuel intakes 16. Incomplete combustion of a fuel mixture contributes materially to air pollution but it has been found difficult to directly ignite a properly balanced mixture of oxygen and fuel. Under such circumstances the combustible fuel components are so rarified that normal ignition systems are incapable of igniting a balanced mixture. The injector 17 provides a means whereby adequate ignition and heat of ignition is obtained in a cylinder containing a compressed quantity of chemically balanced fuel mixture.

Each cylinder receives a balanced mixture of air and fuel from each intake 16, the mixture being provided by a conventional carburetor system connected to the intake but not to the injector 17. A correct air and fuel mixture will be such that adequate oxygen is present to provide for at least substantially complete combustion of the combustible components of the fuel. With the system of the present invention, the oxygen content can even somewhat exceed that which is chemically required to assure complete combustion. The air-fuel mixture is compressed in the cylinder and at optimum crank angle the opening 64 in the cylinder cap 26 registers with the fuel injector 17 and plug 18. The pressure of the mixture in the cylinder is sufficient to lift the piston 69 of the injector in the housing 66 resulting in adequate pressurization of the raw fuel in the chamber 70 to an extent to overcome the preloaded valve 88 for the discharge of a prescribed quantity of raw fuel through the spray nozzle 89 directly into association with the sparking end of the plug 18. The raw fuel injected in this manner into the open area of the cylinder cap 26 is immediately ignited and the firing thus created is sufficient to provide for ignition of the compressed rarified mixture. The amount of fuel injected is quite small and will vary depending upon the size of the cylinder, the degree of rarification of the main mixture, etc. Adjustment, such as by regulation of the strength of the spring 89, is made to obtain the minimum amount of raw fuel for efficient firing. The fuel ignition system may be of any suitable type including the use of conventional distributor spark timing or glow plugs as a substitute for the spark plugs 18. When the special timing gear unit 41 is used in the engine, the ignition system will preferably comprise glow plugs as the timing gear unit eliminates the necessity of using the somewhat troublesome and complicated conventional distributor.

FIGS. 11 and 12 illustrate a modified form of cylinder firing and timing arrangement involving the controlled tapping of the cylinder while firing is at least substantially completed during the power stroke with the transmitting of a controlled quantity of ignited or sufficiently hot gas to the preceding or subsequent cylinder, as the case may be, for firing thereof. This eliminates the need for a sparking or glow plug ignition system other than for purposes of initially starting the engine. The particular continuous firing arrangement to be described is of a nature which readily lends itself to providing for controlled timing of the engine as an alternative means for the timing gear unit 41 previously described.

The ring member 11 in the form of the engine illustrated in FIGS. 11 and 12 still includes the fuel intake 16, ignition plug 18 and exhaust 19. In advance of each exhaust 19 in the direction of rotation of the piston housing 20, a transverse bore 95 is formed in the ring member 11 extending in communication with opposite faces thereof and in communication with longitudinally aligned slot-like ports 96 extending inwardly therefrom into communication with the inner annular wall 28. The ports 96 are arranged in successive order in the direction of rotation of the piston housing 20 for successive alignment with a cylinder. One end of a tube 97 extends from communication with the bore 95 outwardly of the ring member 11 and parallels the same over an arcuate segment thereof. The other end of the tube 97 extends vertically inwardly and defines a suitable port 98 in the ring member in communication with the inner annular surface 28 and succeeding cylinders of the piston housing. Each tube 97 extends to one side of the exhaust 19 and intake 16, FIGS. 1 and 2 illustrating the annular cover member 12 being formed with channel-like enlargements 100 which overlie the tubes and which conform with the general configuration and extent of the tubes.

FIGS. 13 and 14 illustrate a valve arrangement mounted in each bore 95 for use in controlling the firing of adjacent cylinders. The valve arrangement includes a rotatable valve element 101 having a solid end portion 102 and a tubular end portion 103. The valve element 101 is rotatably mounted in the bore 95 and the solid end portion 102 is formed with a projection 104 which is received through an aligned opening 105 in the adjacent end plate 13 and which projects outwardly therefrom and has attached thereto to a control arm 106 for rotating the entire valve element. The annular end 103 of the valve element is formed with a longitudinal slot 107 therein for selective registration with one of the ports 96 upon rotation of the valve element 101.

The outer end of the annular portion 103 of the valve element 101 is in abutment with a poppet valve 108 mounted in a valve housing 109 and including a stem 110 projecting outwardly through an opening 111 in the opposite end plate 14. The outer surface of the end plate 14 includes a striker plate 112 with the valve stem 110 projecting outwardly therefrom and including a suitable abutment means such as a nut 113, illustrated for purposes of explanation only, which is in engagement with the striker plate 112.

The valve element 108 includes a valve head having projecting side flange portions 114 which in the closed position of the valve are in abutment with edge portions of the annular end 103 of the valve element 101. A spring 115 engages the opposite ends of the flange portions 114 to urge the valve into closed position. The valve element is formed with an arcuate face portion 116 to aid in directing the cylinder gas into the tube 97 when the valve element 108 is opened. The face of the valve element 108 is formed with a flat top edeqe 117 which permits slight exposure of the tube 97 with the annular portion 103 of the valve element 101 at all times even when the valve element 108 is closed. This exposure space permits exhausting of the tube 97 as will be described.

Use of the firing and timing arrangement described involves the rotation of the valve element 101 into selected alignment of the slot 107 thereof with one of the ports 96 thus controlling the time of the cycle at which the cylinder is placed in communication with the firing tube 97. The arrangement is such that the cylinder becomes aligned with the various ports 96 during the latter part of the power stroke during which the fuel mixture therein may be still burning. Thus hot gas is introduced into the annular end 103 of the valve element 101 and the pressure thereof acts against the spring 115 to open the poppet valve 108 for communication with the tube 97. The gas moves along the tube 97 through the port 98 at the opposite end of the tube at which time the next preceding cylinder is aligned therewith and is fired by the gas delivered through the tube. By selecting the particular port 96 through which firing of the next preceding cylinder is controlled, the timing of the engine can be adjusted.

If the gas introduced into the tube 97 is incapable of igniting the freshly compressed mixture in the preceding cylinder, the movement of the valve stem 110 of the poppet valve 108 outwardly of the end wall 14 of the engine can be used mechanically to time the spark of the next preceding plug 17. As only a small quantity of gas moves through the tube 97, it would not interfere with the proper plug firing of the preceding cylinder. The operating lever 106 for the valve element 101 is merely illustrative of some suitable means used to rotate the valve element for selection of the appropriate timing port 96. A governor control system operated by the accelerator could be a part of such means. Similarly, the nut 113 received on the outer end of the valve stem 110 is merely indicative of suitable means for attachment to the valve stem to utilize the mechanical work thereof.

For each type of operation described above in connection with FIGS. 8 and 12 it is desirable to take advantage of auxiliary power take-off immediately prior to final exhausting of each cylinder. For this purpose, the ring member 11 along the inner surface 28 thereof is formed with a suitable auxiliary exhaust port 63 which in the form of the mood of operation of FIG. 12 is located between the firing and timing ports 96 and the main exhaust 19. As shown in FIGS. 11 and 15, a transverse bore 119 is formed in the ring member 11 extending from opposite end faces thereof immediately beyond the bore 95 and similar thereto. Each bore 119 is in communication with a slot-like port 63 which angles into communication with the inner surface 28 and is further in communication with a slot-like port 120 which angles therefrom into communication with the exhaust 19. A tube 121 is rotatably received in the bore 119 and includes an end portion 122 defining a valve housing and which projects outwardly through a suitable aperture in the adjacent end plate. A spring mouted ball check valve 123 is received in the portion 122 and a tube connection 124 is also suitably attached thereto and which extends to a suitable exhaust gas storage container (not shown). The opposite open end of the tube 121 has received therein a piston guide 125 slidably receiving therethrough a piston rod 126 having at the inner end thereof a piston head 127 slidably engaging the inner surface of the tube 121. A spring 128 extends between the guide 125 head 127 and urges the head 127 in a direction into the tube 121. The stem 126 extends outwardly through a suitable opening in the adjacent end plate and through a striker plate 129 mounted on the outer surface of the end plate and has attached thereto a suitable stop means, such as a nut 130, to limit the full extension of the piston into the tube 121.

The tube 121 inwardly of the piston head 127 is formed with a longitudinal slot 131 which is arranged for alignment with one of the ports 63 or 120 upon appropriate rotational positioning of the tube 121. Suitable means may be used to engage the outer end portion 122 of the tube 121 to rotate the same for selective slot alignment. Generally, the slot 131 will at all times be aligned with the port 63.

FIGS. 16A–16D illustrate the sequence of operation of a single piston during a single cycle thereof. FIG. 16A illustrates the piston housing 20 moving in the direction of the arrow to the left as viewed with the cylinder terminating communication with the final exhaust 19 and moving toward communication with the intake 16 through which a fuel mixture is delivered into the cylinder during the downstroke of the piston for charging of the cylinder. FIG. 16B illustrates the piston during the compression stroke with the cylinder being located intermediate the intake 16 and the port 98 of the firing tube 97. FIG. 16C illustrates the cylinder in a position beyond the port 98 of the firing tube 97 and the plug 17 with the piston undergoing the power downstroke after firing of the compressed fuel mixture, either as a result of use of the firing tube 97 or the separate plug 17. FIG. 16D illustrates the cylinder after it has passed the timing ports 96 while the piston is at the end of the power downstroke. As previously described, the communication of the selected port 96 with the cylinder results in the exhausting of hot gas from the cylinder into the firing tube 97 for use in firing the preceding cylinder.

FIG. 16D illustrates the cylinder in direct communication with the port 63 with the result that exhaust gas is delivered into the tube 121 and the pressure thereof is applied against the piston head 127 to move same toward the open end of the tube 121 against the spring 128 (see FIG. 15). The stem 126 then moves outwardly from the adjacent end plate of the engine and this movement can be translated into positive work, such as for utilization in the operation of a hydraulic compressor for accessory power equipment such as power steering and power brakes as well as air conditoning.

The exhaust gas introduced into the tube 121 also acts against the check valve 123 and a prescribed quantity of pressurized gas is released into the tube 124 for delivery to storage. This gas is under substantial pressure and can be used to operate automotive or marine accessories, such as power equipment and air conditioning. This hot gas can be used for heating purposes or can be cooled for subsequent expansion in an air cooling unit. The piston in the tube 121 is arranged for consistent repetitive power output and with the valve element 108 of the timing and firing arrangement previously described, can be used to advantage in providing power for operation of accessories without interfering with efficient operation of the engine. Continued movement of the cylinder from the position in FIG. 16D results ultimately in communication with the main exhaust 19 for complete exhausting of the cylinder to eliminate any back pressure therein which might interfere with continued efficient operation of the engine.

With the use of the sequence of operation illustrated in FIGS. 11 and 12, a cylinder cap 133 of FIG. 17 is preferably used. This cap includes a somewhat limited central opening 134 which permits more exacting control of the cylinder as the same becomes progressively aligned with the numerous ports during a single cycle of operation. Preferably, each cylinder cap 133 as well as each preferred form of intermediate sealing shoe 135 (FIG. 18) used with the arrangement of FIGS. 11 and 12 includes multiple grooves in the surfaces thereof which cooperate with the main exhaust 19 in the ring member 11 to provide for the relieving of exhaust gas from the ports 96 and 63 and the elements associated therewith including the firing tube 97.

Referring particularly to FIG. 12, the ports 96 and 63 each include end enlargements or groove-like extensions 136 which are longitudinally aligned. First considering a cylinder cap 133 in the direction of movement thereof along the inner surface 28 of the ring member 11, the leading portion of the cap may be formed with a generally L-shaped groove 137 with the transverse portion thereof arranged to overlie the main exhaust 19 and with the trailing leg portion thereof being arranged to overlie the extensions 136 of the ports 96 and 63. With this arrangement the selected port 96 which is in communication with the firing tube 97 is placed in communication with the groove 137 before the cylinder opening 134 becomes aligned therewith. The groove 137 is designed to permit at least momentary overlapping between the main exhaust 19 and the selected port 96, as well as the port 63, to provide for the relieving of exhaust gas pressure in the firing tube 97 just immediately prior to the transmission thereinto of fresh firing gas from the cylinder. The exposure space defined by the flat top edge 117 of the valve element 108 permits exhausting of the tube 97. The cap may further include another groove 138 which follows the main opening 134 in the direction of movement thereof and which also functions to momentarily overlie the main exhaust 19 and the ports 96 and 63 to aid in relieving or removing exhaust gas from the various ports and the firing tube 97. In this respect the grooves 137 and 138 are somewhat cumulative in their effect bearing in mind that the speed of operation is rather substantial and there is little opportunity for individual grooves to dwell sufficiently for complete exhaust gas pressure release.

With the aspect of cumulative effect in mind, each sealing shoe 135 may also be formed with suitable types of pressure relieving grooves such as the centrally located square grooves 139 and 140 and the leading transverse groove 141 having associated therewith a trailing and narrow longitudinal groove portion 142. The grooves 139–141 are designed to overlap the main exhaust 19 and the various ports 96 and 63 during a very short dwell period, and the groove extension portion 142 aids in the overall pressure relieving function by overlying the port extensions 136. Any suitable arrangement of grooves configurations may be used for the purposes described both with respect to the cylinder caps 133 and the sealing shoes 135. The grooves should not be too extensive as it is essential that the cylinder caps and sealing shoes maintain adequate sealing action with the inner surface 28 of the ring member for efficient functioning of the engine. To aid in this respect the sealing shoes 135 are formed with opposite end extensions 143 which are suitably recessed in the outer surface of the piston housing 20 and spring mounted therein in much the same manner as the spring mounting of the cylinder cap 26 shown in FIG. 19. The extensions 143 include spring guide pins 144 projecting inwardly therefrom and the outer ends of the extensions are formed with arcuate shapes to fit snugly against adjacent edge portions of the cylinder caps. In this respect the sealing shoes 135 may be formed from the more expensive long-life materials which provide the requisite sealing action with the inner surface 28 of the ring member.

The port 120 shown in FIG. 11 may if desired be continually in communication with the interior of the tube 121 for continuous pressure relieving thereof. Another slot could be formed in the tube for this purpose. The exhaust gas is injected into the tube 121 under such force that the valve 123 and the piston 127 will operate to perform the intended functions without the port 120 interfering with the same. Under certain conditions it may be desirable to merely use the port 120. Rotation of the tube 121 to place the slot 131 in communication with the port 120 would result in activation of the exhaust gas power take-off mechanism when the cylinder becomes aligned with the main exhaust 19. In this respect the illustration of the two ports 63 and 120 is merely for the purpose of explaining an alternative arrangement bearing in mind that generally only the single port 63 will be used.

The lubricant circulating system of the engine includes unique features from the standpoint of providing for continuous lubricant replacement in the various parts of the engine accompanied by continuous lubricant cooling in cooperation with the coolant jacket portions of the end plates 13 and 14. Referring to FIG. 7, lubricant is introduced into the engine through the connection 53 into an enlarged lubricant receiving area 146 in the cover plate 44 about the shaft 15. This portion of the shaft includes a transverse port 147 receiving lubricant therein and communicating with a longitudinally inwardly extending passage 148 which extends to the various cranksections 36. Lubricant is supplied to the surfaces of the cranksections through suitable ports or passages (not shown) to fully lubricate the relatively rotating end connections of the connecting rods 25. As a result of this arrangement, lubricant is freely available in the interior of the piston housing 20 and a sufficient amount is subjected to the action of centrifugal force during rotation of the piston housing. Furthermore, the connecting rods and cranksections tend to throw the lubricant outwardly to provide for complete lubrication of the cylinders and pistons.

As a result of the substantial effect of centrifugal force, there is a tendency in radial engines for lubricant to stagnate in the cylinders and it is difficult to provide suitable means for replacement thereof. FIGS. 19 and 20 illustrate the provision of combination baffle means and ports in the pistons and cylinders to provide for continuous lubricant circulation and replacement. Each piston 22 in the head 23 thereof is formed with a pair of oppositely positioned baffle plates 149 which are directed inwardly and inclined downwardly toward the pivotal connection of the connecting rod 25 with the piston. The baffle plates 149 are arcuately shaped along their lower edge portions 150 to define openings therein immediately adjacent the connection of the connecting rod 25. The depending skirt portion 151 of the piston head immediately below the base of the baffle plates 149 is formed with a plurality of ports 152 which during reciprocation of the piston in the cylinder 21 become aligned with slots or ports 153 which extend through the cylinder sleeve and are continually aligned with corresponding slots or ports 154 in the piston housing, these latter ports being in communication with the core openings 30 of the piston housing.

The action of centrifugal force and the splashing of the lubricant results in the passage of lubricant upwardly into the piston head 23 for lubrication of the piston rings 24, the lubricant passing through the openings in the baffle plates 149. On the upstroke of the piston, a certain quantity of the lubricant in the head thereof is forced downwardly through the openings defined by the baffle plate edges 150. However, under normal conditions this same quantity of lubricant would tend to return to the piston head following completion of the upstroke as the result of centrifugal force and the continued splashing action. By provision of the inwardly directed baffle plates 149 a sufficient amount of lubricant is deflected by the bottom surfaces of the plates and the inclination of the plates as illustrated results in the directing of this amount of lubricant into the ports 152 during the downstroke of the piston. During this downstroke the ports 152 become aligned with the continuously aligned ports 153 and 154 and the lubricant trapped by the baffle plates 149 is forced into the core openings 30.

Referring particularly to FIG. 5, lubricant introduced into the core openings 30 will ultimately move to the outer end surfaces of the piston housing 20 and centrifugal force will cause the lubricant to flow radially outwardly along these outer end surfaces. Lubricant may dwell in the grooves 32 but, regardless of this feature, the lubricant is adequately cooled by the adjacent end plates and the jacket portions 51 thereof.

FIGS. 3, 5 and 21 illustrate the provision of circumferentially continuous lubricant collecting grooves 155 in the opposite edges of the ring member 11 adjacent the outer edges of the piston housing 20. Lubricant moving along the outer end surfaces of the piston housing will collect in the peripheral grooves 155 and may be withdrawn therefrom through suitable outlet means. Such means as shown in FIGS. 5 and 21 may include an oil collection pocket 156 in communication with an oil return connection 157.

FIG. 22 schematically illustrates a suitable lubricant circulating system. Lubricant flows from the engine 10 through the connections 157 into a suitable storage tank or pump 158 which is maintained under partial vacuum to aid in drawing the lubricant from the engine, namely, the collection pockets 156 thereof. The vacuum may be established by a suitable connection 159 leading to the carburetor intake manifold. An oil return line 160 delivers oil to a conventional pump for delivery of the same into the engine 10 through the connection 53.

Obviously certain modifications and variations of the invention as hereinbefore set forth may be made without departing from the spirit and scope thereof, and therefore only such limitations should be imposed as are indicated in the appended claims.

I claim:

1. In a radial engine having a stationary housing defining an internal annular chamber in which a rotary piston housing is received, said piston housing having a plurality of circumferentially spaced cylinders receiving radially acting pistons therein with open areas formed in said piston housing between said cylinders, the heads of said pistons being exposed along an inner annular wall of said chamber, power shaft means extending axially through said stationary housing and connected to said pistons, drive means interconnecting said shaft means with said piston housing to rotate the same within said chamber, and a plurality of fuel supply and combustion gas exhaust units carried by said stationary housing in spaced relation along said inner annular wall in communication with said piston housing, the improvement comprising said stationary housing including a main ring portion with the inner surface thereof defining said annular wall of said chamber, a pair of opposite end plates sealing off said chamber and through at least one of which said shaft means extends, at least said end plates having as a part thereof coolant circulating jackets which at least radially overlie said cylinders and open areas of said piston housing, and a lubricating system including lubricant supply means forming a part of said shaft means and communicating with said piston housing to lubricate said pistons, lubricant distribution means in said piston housing to deliver lubricant to said open areas and outer surfaces thereof in heat transfer relation with said jackets, and lubricant collection and take-off means along said ring portion for centrifugal accumulation and return of lubricant therein.

2. The engine of claim 1 wherein said supply and exhaust units each include in the direction of rotation of said piston housing an air-fuel mixture supply, a raw fuel injector in combination with ignition means, and combustion gas exhaust means, said fuel injector comprising fuel inlet means defining a compression chamber, a piston in said chamber and movable thereinto to compress fuel therein, means urging said piston out of fuel compressing position in said chamber, compressed fuel discharge means in communication with said chamber, and preload valve means closing off said discharge means, whereby actuation of said piston in said chamber compresses the fuel therein to an extent to overcome the preload condition of said valve means to provide for a jet-like flow of fuel through said discharge means.

3. The engine of claim 1 wherein said injection and exhaust units each include in the direction of rotation of said piston housing an air and fuel mixture supply in combination with ignition means, and combustion gas exhaust means, said combustion gas exhaust means comprising initial exhaust gas take-off means having a one-way check valve to bleed off exhaust gas under predetermined pressure conditions, and final exhaust gas take-off means for complete piston back pressure release.

4. The engine of claim 1 wherein each piston includes baffle means in the head portion thereof past which lubricant is moved into said head portion by centrifugal force during rotation of said piston housing, and lubricant discharge openings in said head portion adjacent said baffle means, said baffle means being arranged relative to said discharge openings to direct lubricant therethrough during the downstroke of said piston.

5. In a radial engine wherein an external annular housing has a rotatable piston housing mounted therein with power take-off shaft means projecting centrally therefrom, said piston housing including cylinders therein exposed along the outer periphery thereof and receiving reciprocating pistons driving said shaft means and said shaft means driving said piston housing, the provision of timing means forming a part of said external housing and in communication with said cylinders during rotation of said piston housing, said timing means comprising a plurality of a series of cylinder exhaust ports spaced in the direction of rotation of said piston housing, a cylinder firing tube extending from communication with each series of said ports into communication with an adjacent firing position of an adjacent cylinder, and adjustable valve means between the ports of each series and the firing tube for selective communication between a port and said tube, whereby ignited fuel in one cylinder is transmitted to another cylinder to fire the same in a plurality of selected positions of said one cylinder.

6. The engine of claim 5 wherein said adjustable valve means includes a poppet valve preloaded to limit the amount of ignited fuel introduced into a firing tube.

7. In a radial engine wherein an external annular housing has a rotatable piston housing mounted therein with power take-off shaft means projecting centrally therefrom, said piston housing including cylinders therein exposed along the outer periphery thereof and receiving reciprocating pistons driving said shaft means and said shaft means driving said piston housing, the provision of timing means forming a part of said external housing and in communication with said cylinders during rotation of said piston housing, said timing means comprising a plurality of a series of cylinder exhaust ports spaced in the direction of rotation of said piston housing, a cylinder firing tube extending from communication with each series of said ports into communication with an adjacent firing position of an adjacent cylinder, and adjustable valve means between the ports of each series and the firing tube for selective communication between a port and said tube, whereby ignited fuel in one cylinder is transmitted to another cylinder to fire the same in a plurality of selected positions of said one cylinder, said piston housing adjacent each cylinder thereof including exhaust gas flow areas which during rotation of said piston housing provide communication between each firing tube and an adjacent exhaust gas outlet forming a part of said external housing to remove exhaust gas from said tube in preparation for repeated cylinder firing use thereof.

8. In a radial engine wherein an external annular housing has a rotatable piston housing mounted therein with power take-off shaft means projecting centrally therefrom, said piston housing including cylinders therein exposed along the outer periphery thereof and receiving reciprocating pistons driving said shaft means and said shaft means driving said piston housing, the provision of timing means forming a part of said external housing and in communication with said cylinders during rotation of said piston housing, said timing means comprising a plurality of a series of cylinder exhaust ports spaced in the direction of rotation of said piston housing, piston means in said external housing and in communication with each series of ports for operation in response to pressurized gas introduced through said ports upon alignment of a cylinder therewith during rotation of said piston housing, and adjustable valve means between the ports of each series and said piston means for selective communication between the ports and said piston means, whereby gas from one cylinder operates said piston means during a selected portion of the firing cycle of said one cylinder with the mechanical work of said piston means being available to control the firing of another cylinder during rotation of said piston housing.

9. In a radial engine wherein an external annular housing has a rotatable piston housing mounted therein with power take-off shaft means projecting centrally therefrom, said piston housing including cylinders therein and receiving reciprocating pistons driving said shaft means and said shaft means driving said piston housing, the improvement comprising lubricant circulation control means forming a part of said piston housing and each piston thereof, each piston including baffle means in the head portion thereof past which lubricant is moved into said head portion by centrifugal force during rotation of said piston housing, lubricant discharge openings in the wall of each cylinder and in communication with recirculation passages in said piston housing, and ports in the head portion of each piston adjacent said baffle means and arranged for communication with said openings during reciprocation of said piston, said baffle means being arranged relative to said ports to direct lubricant therethrough when said ports are in communication with said openings.

10. In a radial engine wherein an external annular housing has a rotatable piston housing mounted therein with power take-off shaft means projecting centrally therefrom, said piston housing including cylinders therein and receiving reciprocating pistons driving said shaft means and said shaft means driving said piston housing, the improvement comprising lubricant circulation control means forming a part of said piston housing and each piston thereof, each piston including baffle means in the head portion thereof past which lubricant is moved into said head portion by centrifugal force during rotation of said piston housing, lubricant discharge openings in the wall of each cylinder and in communication with recirculation passages in said piston housing, and ports in the head portion of each piston below said baffle means and arranged for communication with said openings during reciprocation of said piston, said baffle means being inclined inwardly and downwardly from said head portion with the base thereof immediately above said ports to direct lubricant therethrough when said ports are in communication with said openings.

References Cited by the Examiner

UNITED STATES PATENTS

| | | | |
|---|---|---|---|
| 989,221 | 4/11 | Allyn | 123—44 |
| 1,220,455 | 3/17 | Rasmusen et al. | 123—44 |
| 1,242,197 | 10/17 | Johnson | 123—43 |
| 1,286,985 | 12/18 | Freer | 184—9 |
| 1,423,395 | 7/22 | Brown | 123—44 |
| 1,633,158 | 6/27 | Archaouloff | 123—139 |
| 1,696,060 | 12/28 | Smith | 123—143 |
| 1,722,258 | 7/29 | Harper | 123—43 |
| 1,722,260 | 7/29 | Harper | 123—44 |
| 1,957,541 | 5/34 | Johnson | 123—143 |
| 2,003,563 | 6/35 | Szekely | 184—6 |
| 2,184,357 | 12/39 | Mallory | 123—32 |
| 2,273,025 | 2/42 | Dillstrom | 123—44 |
| 2,280,487 | 4/42 | Heylandt | 60—15 |
| 2,758,576 | 8/56 | Schlamann | 123—32 |
| 2,861,422 | 11/58 | Magill | 123—139 |
| 2,879,753 | 3/59 | McKinley | 123—139 |
| 2,886,014 | 5/59 | Konrad et al. | 123—32 |
| 2,986,134 | 5/61 | Bernard | 123—139 |
| 3,003,307 | 10/61 | Klaue | 60—13 |
| 3,003,308 | 10/61 | Beaven | 60—13 |
| 3,042,010 | 7/62 | McCrory et al. | 123—32 |

FOREIGN PATENTS

| | | |
|---|---|---|
| 28,250 | 12/08 | Great Britain. |
| 1,508 | 1/12 | Great Britain. |

RICHARD B. WILKINSON, *Primary Examiner.*

FRED E. ENGELTHALER, KARL J. ALBRECHT,
*Examiners.*